United States Patent
Du et al.

(10) Patent No.: US 11,755,291 B1
(45) Date of Patent: *Sep. 12, 2023

(54) REGISTRATION OF MULTIPLE USER DEFINED FUNCTIONS

(71) Applicant: Snowflake Inc., Bozeman, MT (US)

(72) Inventors: Jianzhun Du, Kirkland, WA (US);
Orestis Kostakis, Redmond, WA (US);
Kristopher Wagner, Lahaina, HI (US);
Yijun Xie, Kirkland, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,020

(22) Filed: Jan. 31, 2023

Related U.S. Application Data

(63) Continuation of application No. 17/834,668, filed on Jun. 7, 2022, now Pat. No. 11,620,110.

(51) Int. Cl.
*G06F 8/30* (2018.01)
*G06F 9/54* (2006.01)

(52) U.S. Cl.
CPC .............. *G06F 8/315* (2013.01); *G06F 9/543* (2013.01)

(58) Field of Classification Search
None
See application file for complete search history.

(56) References Cited

U.S. PATENT DOCUMENTS

| | | |
|---|---|---|
| 11,620,110 B1 | 4/2023 | Du et al. |
| 2004/0088333 A1 | 5/2004 | Sidman |
| 2009/0254884 A1 | 10/2009 | Rama et al. |
| 2012/0041752 A1 | 2/2012 | Wang et al. |
| 2012/0191642 A1 | 7/2012 | George |
| 2012/0191690 A1 | 7/2012 | George |
| 2012/0239612 A1 | 9/2012 | George et al. |
| 2013/0205287 A1 | 8/2013 | Aslot et al. |
| 2015/0309980 A1 | 10/2015 | Glass et al. |
| 2018/0101583 A1 | 4/2018 | Li et al. |

OTHER PUBLICATIONS

U.S. Appl. No. 17/834,668, filed Jun. 7, 2022, Registration of Multiple User Defined Functions.
"U.S. Appl. No. 17/834,668, Non Final Office Action dated Sep. 9, 2022", 14 pgs.
"U.S. Appl. No. 17/834,668, Notice of Allowance dated Jan. 9, 2023", 18 pgs.
"U.S. Appl. No. 17/834,668, Response filed Dec. 9, 2022 to Non Final Office Action dated Sep. 9, 2022", 11 pgs.

*Primary Examiner* — Qing Chen
(74) *Attorney, Agent, or Firm* — Schwegman Lundberg & Woessner, P.A.

(57) ABSTRACT

The subject technology identifies a set of functions in a set of files corresponding to a library. The subject technology, for each function, registers the function as a user defined function (UDF) based on a set of input parameters utilized by the function and a type of parameter of each of the input parameters. The subject technology provides access to each registered function in a different application.

30 Claims, 7 Drawing Sheets

REGISTRATION OF MULTIPLE USER DEFINED FUNCTIONS

CROSS-REFERENCE TO RELATED APPLICATIONS

This application is a continuation of U.S. Non-Provisional patent application Ser. No. 17/834,668 (now U.S. Pat. No. 11,620,110), filed on Jun. 7, 2022, entitled "REGISTRATION OF MULTIPLE USER DEFINED FUNCTIONS," and the contents of which are incorporated herein by reference in their entirety for all purposes.

TECHNICAL FIELD

Embodiments of the disclosure relate generally to a network-based database system or a cloud data platform and, more specifically, to facilitating registration and use of user defined functions in a performant manner.

BACKGROUND

Cloud-based data warehouses and other database systems or data platforms sometimes provide support for user-defined functions that enable such systems to perform operations that are not available through the built-in, system-defined functions. However, for mitigating security risks, security mechanisms to ensure that user code running on such systems remain isolated are needed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
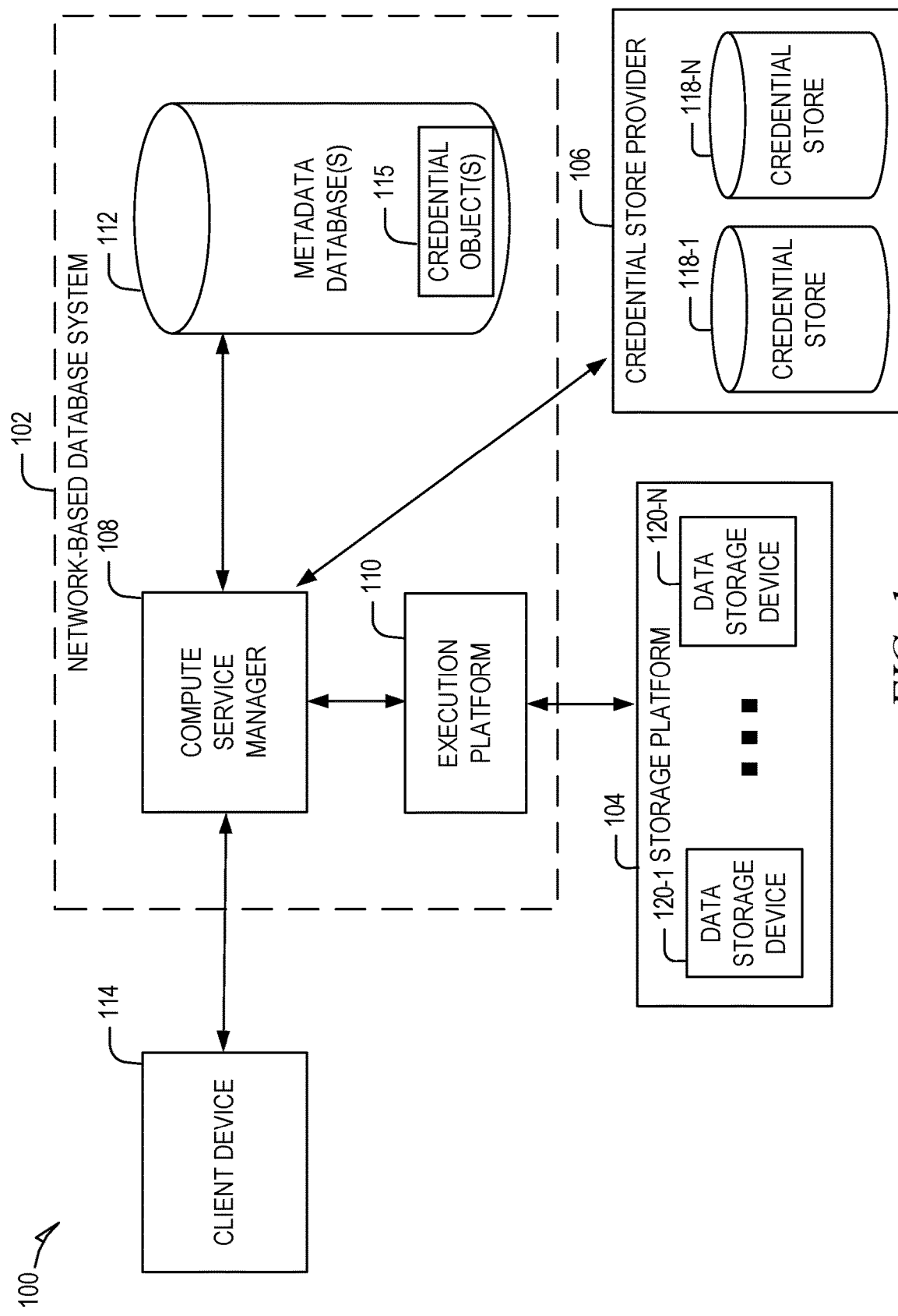
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In computer security, a sandbox (e.g., sandbox environment) is a security mechanism for separating running programs, usually in an effort to mitigate system failures or software vulnerabilities from spreading. A sandbox can be used to execute untested or untrusted programs or code, possibly from unverified or untrusted third parties, suppliers, users or websites, without risking harm to the host machine or operating system. A sandbox can provide a tightly controlled set of resources for guest programs to run in, such as storage and memory scratch space. Network access, the ability to inspect the host system or read from input devices can be disallowed or restricted.

Existing approaches to sandbox environments in database systems may not adequately provide security mechanisms during execution of code in a given user defined function (UDF). As a result, such approaches leave database systems more vulnerable to breaches in system integrity. Moreover, executing arbitrary code by a malicious actor can lead to compromises in memory and data utilized by such database systems. In an example, malicious code may be able to successfully circumvent security measures by improperly or insufficiently configured sandbox environments, which may only provide a single layer of security. In another example, such database systems may not utilize a sandbox environment altogether, and instead utilize a security policy (e.g., configuration file or set of ad-hoc rules) that is reliant on a (singular) particular system component (e.g., a security manager) to enforce.

Aspects of the present disclosure address the above and other deficiencies of providing security for executing user code through utilizing a security mechanism based on a sandbox (e.g., sandbox environment). More specifically, embodiments described herein can advantageously implement a multiple layer sandbox environment for executing user defined functions (UDFs) in a multi-tenant system (e.g., provided by a network-based database system as described further herein). As mentioned herein, a UDF includes arbitrary code, which is provided by a user, that in some examples perform computing operations or invoke functions (e.g., code-based) related to a database query.

Additionally, before being able to utilize UDFs in a given database system, each UDF undergoes a registration process. In existing systems, a single UDF can be registered at a time rather than in batches of UDFs. Embodiments of the subject technology enable registration of multiple UDFs in an automated and seamless manner which facilitates increased utilization of UDFs in various applications and development environments.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (00M) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
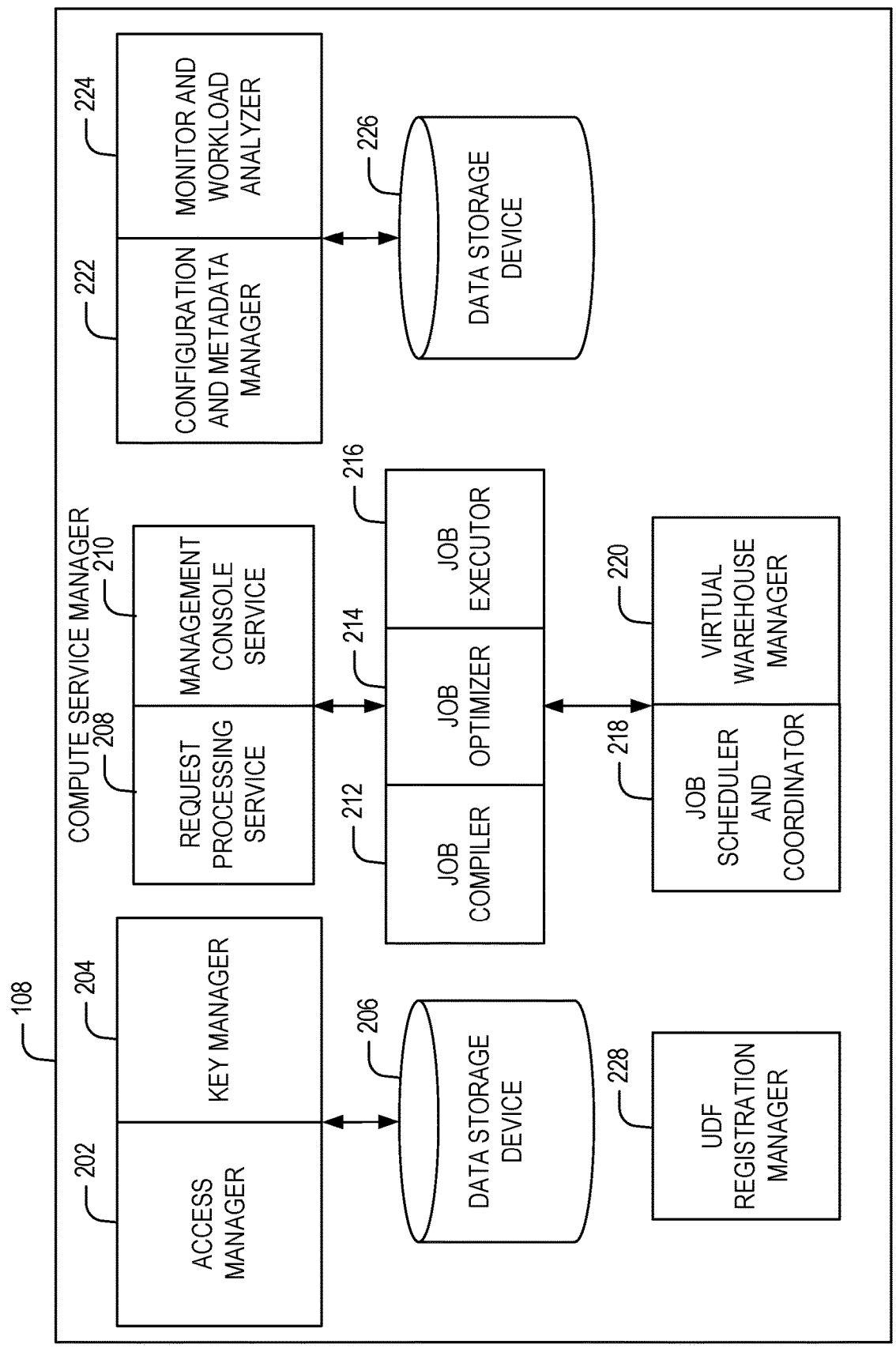
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As further shown, the compute service manager 108 includes a user defined function (UDF) registration manager 228 that performs operations to register multiple UDFs from a set of files as discussed further herein.

Figure 3:
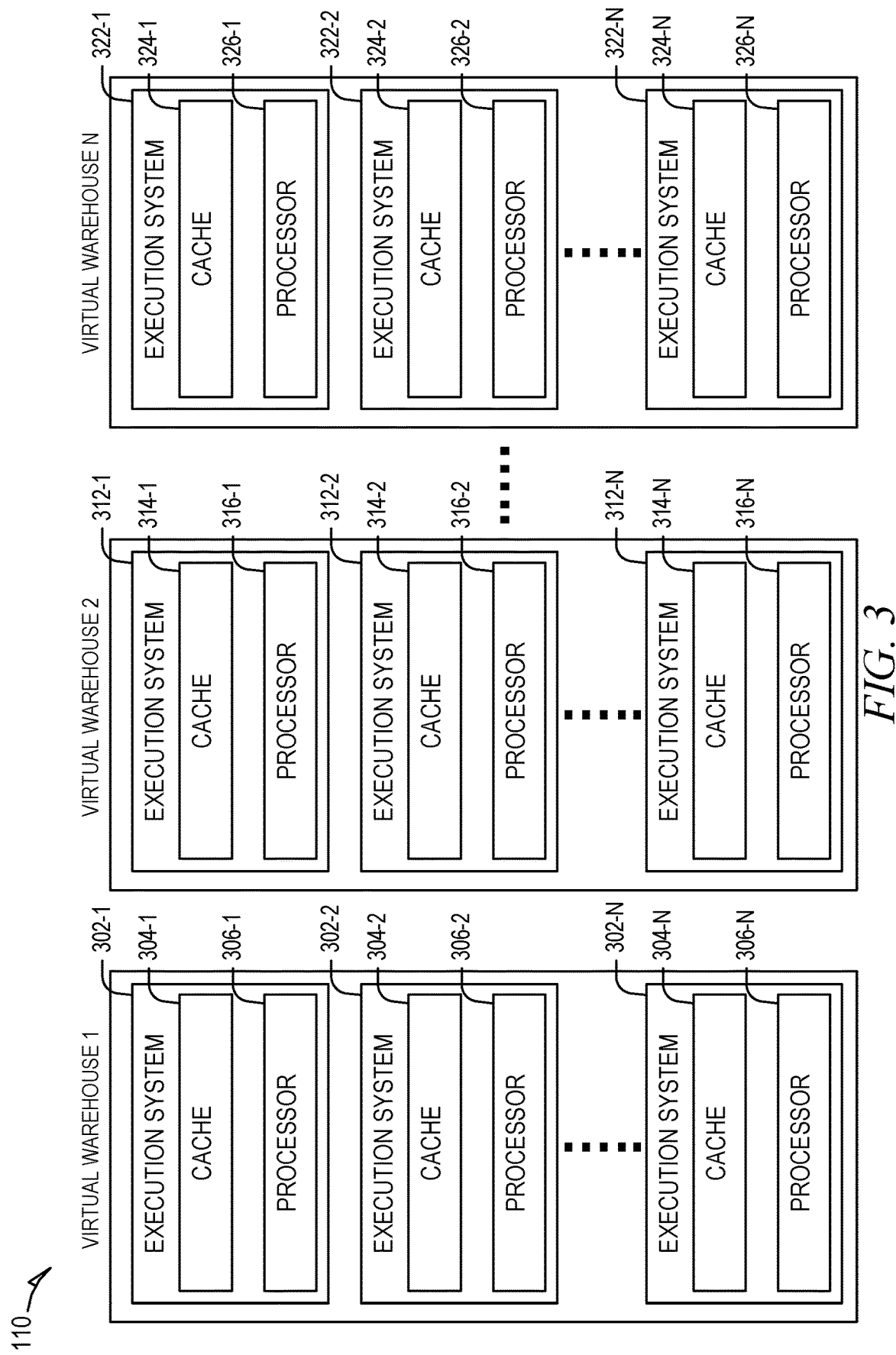
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
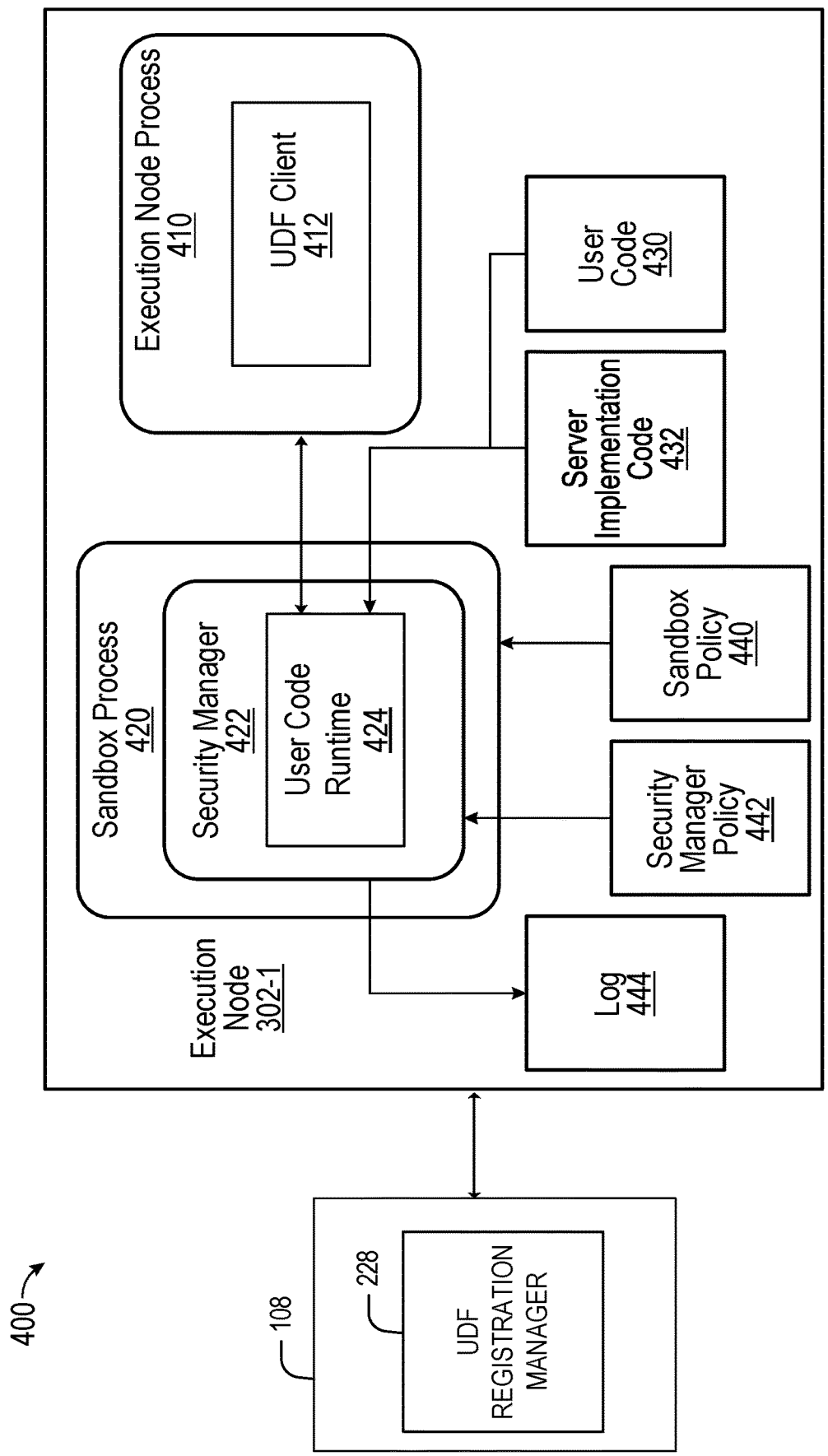
FIG. 4 is a computing environment conceptually illustrating an example software architecture executing a user defined function (UDF) by a process running on a given execution node of the execution platform, in accordance with some embodiments of the present disclosure.

FIG. 4 is a computing environment 400 conceptually illustrating an example software architecture executing a user defined function (UDF) by a process running on a given execution node of the execution platform 110, in accordance with some embodiments of the present disclosure.

As illustrated, the execution node 302-1 from the execution platform 110 includes an execution node process 410, which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 validates all communication from the execution platform 110 to validate that the content and context of that communication are consistent with the task(s) known to be assigned to the execution platform 110. For example, the execution platform 110 executing a query A is not allowed to request access to a particular datasource (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF Client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve security of the computing environment 400 by using a different codebase (e.g., one without the same or fewer potential security exploits).

User code 430 may be provided as a package e.g., in the form of a JAR (JAVA archive) file which includes code for one or more UDFs. Server implementation code 432, in an embodiment, is a JAR file that initiates a server which is responsible for receiving requests from the execution node process 410, assigning worker threads to execute user code, and returning the results, among other types of server tasks.

In an implementation, an operation from a UDF (e.g., JAVA based UDF) can be performed by a user code runtime 424 executing within a sandbox process 420 (described further below). In an embodiment, the user code runtime 424 is implemented as a virtual machine, such as a JAVA virtual machine (JVM). Since the user code runtime 424 advantageously executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node 302-1, or at a separate location such as the storage platform 104. Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa) with the aforementioned advantages described above.

Security Manager 422, in an example, can prevent completion of an operation from a given UDF by throwing an exception (e.g., if the operation is not permitted), or returns (e.g., doing nothing) if the operation is permitted. In an implementation, the Security Manager 422 is implemented as a JAVA security manager object that allows applications to implement a security policy such as a security manager policy 442, and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and interprocess communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., object oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

The following discussion relates to registration of multiple user defined functions (UDF) in accordance with some embodiments of the subject technology. As further shown in FIG. 4, compute service manager 108 includes UDF registration manager 228 which can perform operations to register multiple UDFs as discussed below.

In modern database-like and data-processing systems, users are given the opportunity to define, manage, and execute their own custom code in the form of User Defined Functions (UDFs). UDFs can be further broken down into categories depending on the semantics related to their input and output data types. For example, there exist scalar UDFs that take as input a set of scalar values and return a scalar value. User Defined Table Functions (UDTFs) take as input one or more table-columns and return a column. Similarly, User Defined Aggregate Functions aggregate the data. Embodiments of the subject technology can apply to all types of UDFs, and for the purposes of discussion herein, each type of UDF will be referred to as simply a UDF or UDFs.

In an example, users are provided with the capability to define (e.g., register) single UDFs ("one at a time"). The subject system enables an approach for simultaneously registering multiple UDFs from existing libraries (e.g., files).

In existing systems like Spark (including PySpark), the users register UDFs by issuing a command that takes as input the function object. In the following example, a function (random) is first defined locally in the user's environment, and then registered as a UDF, by issuing the command spark.udf.register( )(example below is in Scala programming language):

val random=udf(( )=>Math.random( ))
spark.udfregister("random",random.asNondeterministic( ))

Similarly, in this example using alternative syntax (specifically decorating a function with the @udf( ) decorator), users can register a UDF by using a locally-defined function:
   @udf("long")
   def squared_udf(s): return s * s
The above UDF can be called by the following:
   spark.table("test").select("id", squared_udf("id").alias("id_squared")))
In another example, a UDF can be registered using the following code:
IF OBJECT_ID (N'dbo.ufnGetInventoryStock', N'FN') IS NOT NULL
   DROP FUNCTION ufnGetInventoryStock;
GO
CREATE FUNCTION dbo.ufnGetInventoryStock(@ProductID int)
RETURNS int
AS
-- Returns the stock level for the product.
BEGIN
   DECLARE @ret int;
   SELECT @ret=SUM(p.Quantity)
   FROM Production.ProductInventory p
   WHERE p.ProductID=@ProductID
      AND p.LocationID='6';
   IF (@ret IS NULL)
      SET @ret=0;
   RETURN @ret;
END;

In such existing systems, it is apparent that users are limited to registering one UDF at a time. Embodiments of the subject technology, given an existing source-code library, enable the extraction and registration of multiple UDFs with a single user-provided command. In an example, the user points to or provides a library-package and from that the subject system automatically registers the contained functions as UDFs. In this manner, the functionality to a computer (e.g., the network-based database system 102 and components thereof) is improved by at least reducing utilization of an amount of computing resources (e.g., processor, memory, network, and the like) as registration of multiple UDFs facilitates at least improved scheduling and processing of a registration process that enables the network-based database system 102 to perform batch processing for UDF registration(s) and allocate computing resources in a more efficient manner. Moreover, the functionality of a computer is improved by enabling various ways to handle errors during UDF registration including ignoring errors or sending notifications to alert of such errors (e.g., while forgoing registration of such an errant UDF) thereby improving an overall stability of the subject system as errant UDFs are not registered and not then allowed to execute malicious or erroneous operations on the subject system.

The aforementioned library does not mean the strict definition of a library that exists in some programming languages. Instead, a "library" as mentioned further herein refers to any collection of functions that can exist within one or more source code files. For example, a library can also be a bunch of source-code files, or even a project in an IDE. When software developers write code, they often use an Integrated Development Environment (IDE), such as Visual Studio, PyCharm, Intellij, and the like, that provides more capabilities and conveniences than programming using a notepad. In view of this, projects are a collection of files that, somehow or other, will get turned into one or more programs.

As shown in FIG. 2, compute service manager 108 can include UDF registration manager 228 that enables registration of multiple UDFs as described in embodiments herein.

UDF registration manager 228 performs the following:
1. Parse the library files and identify the set of contained functions.
2. For each function and its body (e.g., contents), create and execute the appropriate command that registers the function as a UDF.

In an embodiment, UDF registration manager 228 is triggered by the following code to register a UDF called "doubleUdf" that takes in an integer argument and returns an integer value:
import com.snowflake.snowpark_java.types. *;
. . .
// Create and register a permanent named UDF
// that takes in an integer argument and returns an integer
value.
// Specify that the UDF and dependent JAR files should be uploaded to
// the internal stage named mystage.
UserDefinedFunction doubleUdf=
   session
      .udf( )
      .registerPermanent(
      "doubleUdf",
      (Integer x)->x+x,
      DataTypes.IntegerType,
      DataTypes.IntegerType,
      "mystage");
// Call the named UDF, passing in the "quantity" column.
// The example uses withColumn to return a DataFrame containing
// the UDF result in a new column named "doubleQuantity".
DataFrame df=session.table("sample_product_data");
DataFrame dfWithDoubleQuantity=df.withColumn("doubleQuantity",
Functions.callUDF("doubleUdf", Functions.col("quantity")));
dfWithDoubleQuantity.show( );

In view of the above code, UDF registration manager 228 is triggered by a command ("registerPermanent") to register a UDF, and the UDF gets called in the second to last statement: DataFrame dfWithDoubleQuantity= . . . )

The subject system can perform in the following scenarios: a) where a user is interacting directly with a database system UI, or b) is working with client-software, thus interacting remotely with the database system.

In the case of interacting via a client device (e.g., client device 114), the parsing and extraction can either happen on the client-side (in this scenario the client issues a set of register-commands), or the client device uploads the library to the network-based database system 102 and all processing occurs there afterward. In the case of directly interacting with a UI of the network-based database system 102, the library is uploaded to the network-based database system 102 and all subsequent steps for UDF registration are performed on the subject system.

UDF registration manager 228 performs parsing of library files and identifying of a set of included functions. In this regard, UDF registration manager 228 can open a file as text and parse the text therein, or load the file (e.g., importing it) from a program of the same language and perform processing from within the program.

In addition, to support other scenarios, UDF registration manager 228 can enable the following for existing source code of different programming languages:

Extract and register only specific functions in a particular module, or with a specific function-name pattern (the user provides the necessary pattern-string). Similarly, different filtering criteria can be applied.

For the above situation, alternative options are to allow users to annotate the source code directly. In the case of Python for example, allow to add a decorator, even @udf The name of the function created on the servers can be modified according to user-provided pattern (e.g., a function "func1( )" in the library can be registered as "apples func1( )" if the user-provided string were "apples").

If a target UDF has already been defined, allow the users to provide the option to overwrite the existing ones, or fail with error, or fail silently, and the like. To reduce complexity, a default scenario can be chosen in advance and change if the user overrides.

In an example where bytecode (e.g., Java) is provided, the above, with the exception of the annotating the code directly, can be enabled for bytecode.

Figure 5:
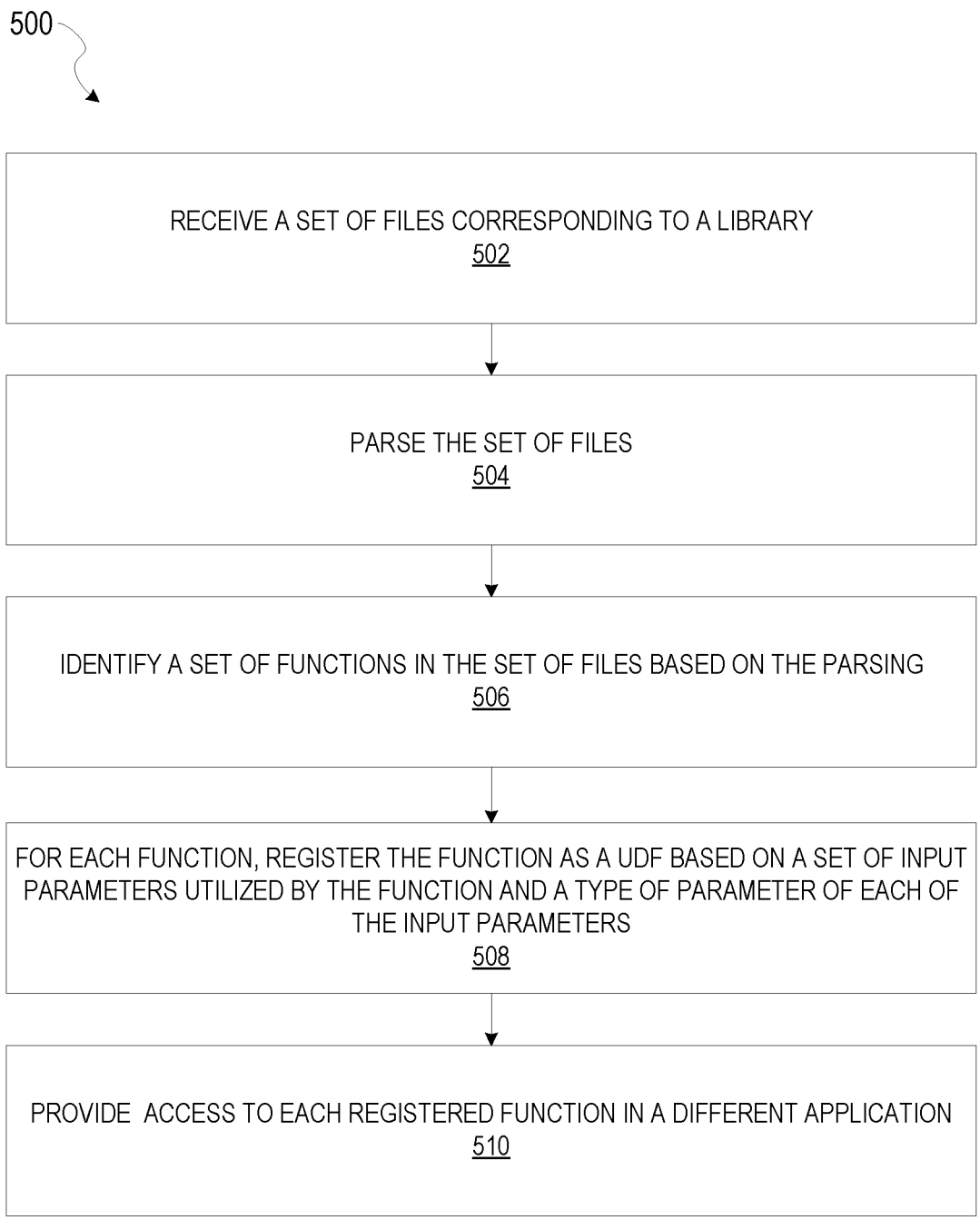
FIG. 5 is flow diagram illustrating operations of a database system in performing a method, in accordance with some embodiments of the present disclosure.

FIG. 5 is flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102, such as components of the execution platform 110. Accordingly, the method 500 is described below, by way of example with reference thereto. However, it shall be appreciated that the method 500 may be deployed on various other hardware configurations and is not intended to be limited to deployment within the network-based database system 102.

At operation 502, the UDF registration manager 228 receives a set of files corresponding to a library, the library comprising a set of functions included in the set of files.

At operation 504, the UDF registration manager 228 parses the set of files.

At operation 506, the UDF registration manager 228 identifies a set of functions in the set of files based on the parsing.

At operation 508, the UDF registration manager 228, for each function, registering the function as a user defined function (UDF) based on a set of input parameters utilized by the function and a type of parameter of each of the input parameters.

At operation 510, the UDF registration manager 228 provides access to each registered function in a different application. In an implementation, access to the registered function(s) is provided by accessing the registered UDF in code (discussed further herein). Moreover, it is appreciated that in some instances multiple functions can be included in a given registered UDF. For example, a first function and a second function can both be included in the same registered UDF. In this instance, accessing the registered UDF would then enable execution of the first function and the second function. In an example, the first function is executed first and then the second function is executed after the first function. However, it is appreciated that there can be mechanisms in the registration process to define or enable an order in which multiple functions are executed when the registered UDF is triggered for execution.

In an embodiment, the compute service manager then receives a request to initiate execution of the UDF corresponding to a particular (now registered) function.

In an embodiment, registering the function as the user defined function includes: generating, using at least a first set of input parameters utilized by a first function and a particular type of parameter of each of the input parameters, a first set of source code, generating, using at least a second set of input parameters utilized by a second function and a second particular type of parameter of each of the input parameters, a second set of source code, combining the first set of source code and the second set of source code into a source code file, compiling the source code file into an executable program, and executing the executable program to perform a registration process to register a particular UDF corresponding to the first function and the second function.

In an embodiment, the registration process includes storing information corresponding to the first function and the second function in a metadata database.

In an embodiment, the first function and the second function are different functions, and the first set of input parameters and second set of input parameters are different input parameters.

In an embodiment, registering the function as the user defined function includes: generating a name for the function based at least in part on a predetermined prefix, the predetermined prefix comprising an alphanumeric string.

In an embodiment, identifying the set of functions in the set of files is based at least in part on a pattern string.

In an embodiment, identifying the set of functions in the set of files is based at least in part on a logical grouping of source code.

In an embodiment, the UDF registration manager 228 determines that a particular UDF has already been registered prior to registering a first function identified from the set of files, the particular UDF and the first function have at least a same function name, and registers the first function as a new UDF, the registering of the first function overwriting and replacing particular UDF as previously registered.

Figure 6:
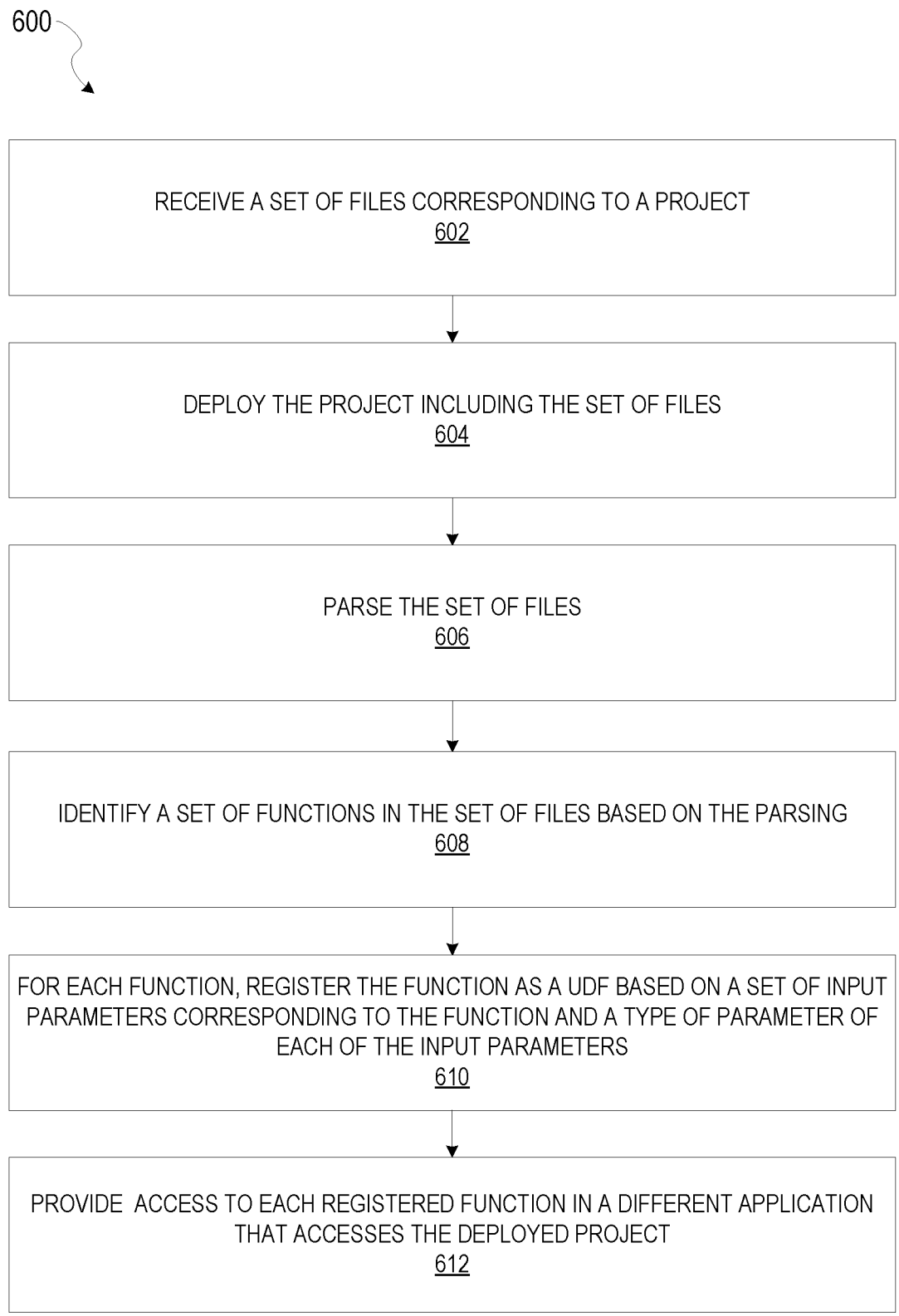
FIG. 6 is flow diagram illustrating operations of a database system in performing a method, in accordance with some embodiments of the present disclosure.

FIG. 6 is flow diagram illustrating operations of a database system in performing a method for determining that an operation from a user defined function (UDF) is restricted within a secure computing environment of a given execution node of the execution platform 110, in accordance with some embodiments of the present disclosure. The method 600 may be embodied in computer-readable instructions for execution by one or more hardware components (e.g., one or more processors) such that the operations of the method 600 may be performed by components of network-based database system 102, such as components of the execution platform 110. Accordingly, the method 600 is described below, by way of example with reference thereto. However, it shall be appreciated that the method 600 may be deployed on various other hardware configurations and is not intended to be limited to deployment within the network-based database system 102.

At operation 602, the UDF registration manager 228 receives a particular set of files corresponding to a project, the set of files comprising source code in a particular programming language, the source code including a particular set of functions.

At operation 604, the UDF registration manager 228 deploys the project including the particular set of files.

At operation 606, the UDF registration manager 228 parses the particular set of files.

At operation 608, the UDF registration manager 228 identifies a particular set of functions in the set of files.

At operation 610, the UDF registration manager 228, for each particular function, registers the particular function as a particular UDF based on a particular set of input parameters utilized by the particular function and a particular type of parameter of each of the input parameters.

At operation 612, the UDF registration manager 228 provides access to each registered particular function in a particular different application that accesses the deployed project.

Figure 7:
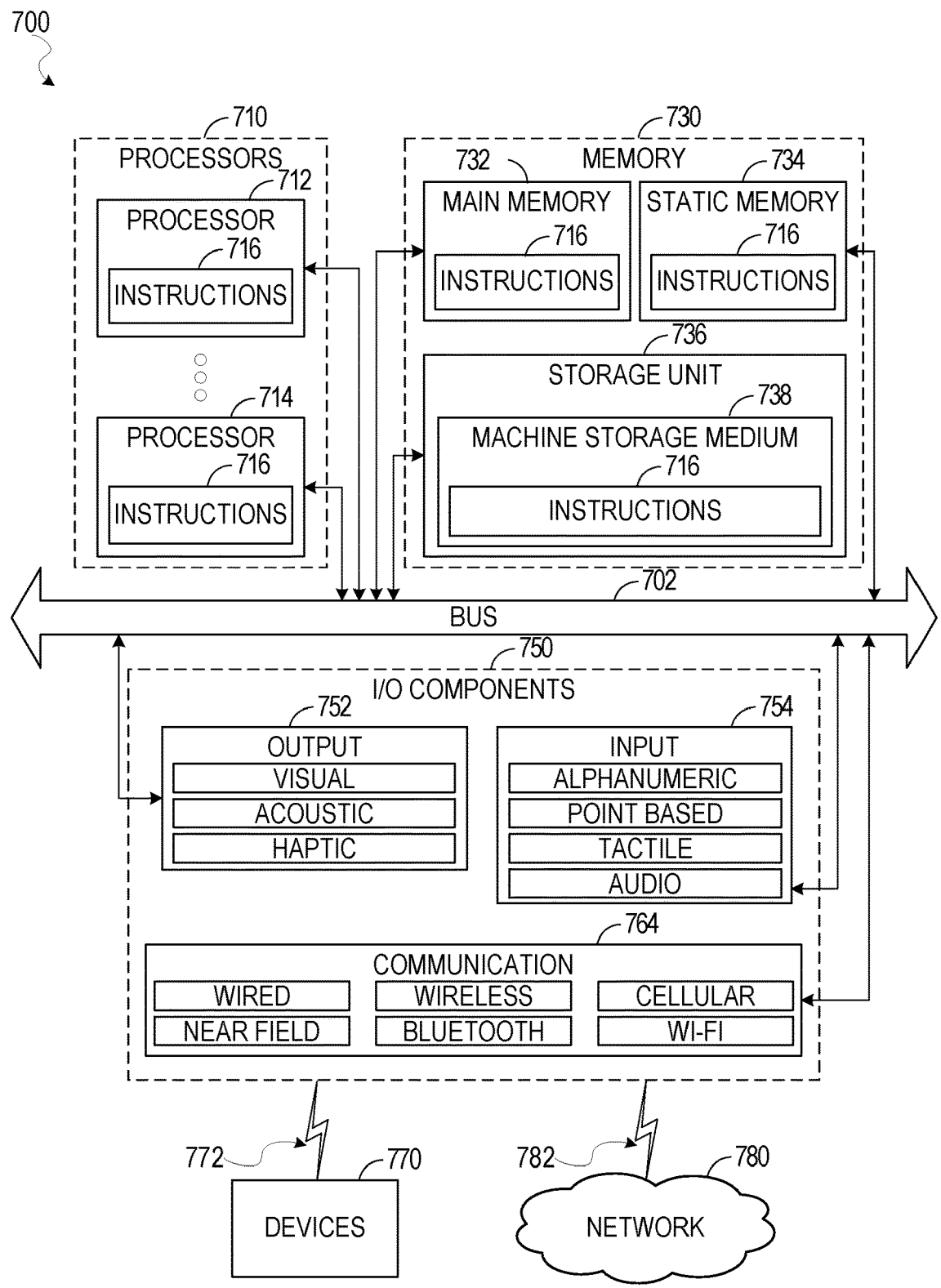
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of the method 500 and method 600. As another example, the instructions 716 may cause the machine 700 to implement portions of the data flows illustrated in at least FIG. 4. In this way, the instructions 716 transform a general, non-programmed machine into a particular machine 700 (e.g., the compute service manager 108 or a node in the execution platform 110) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within machine storage medium 738 of the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the compute service manager 108 or the execution platform 110, and the devices 770 may include the client device 114 or any other computing device described herein as being in communication with the network-based database system 102 or the cloud storage platform 104.

Executable Instructions and Machine Storage Medium

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
   identifying a set of functions included in a set of files corresponding to a library;
   for each function in the set of functions, registering the function as a user defined function (UDF) based on a set of input parameters utilized by the function and a type of parameter of each input parameter of the set of input parameters, wherein registering the function as the UDF comprises:
      generating, using at least a first set of input parameters utilized by a first particular function and a first particular type of parameter of each input parameter of the set of input parameters, a first set of source code;
      generating, using at least a second set of input parameters utilized by a second particular function and a second particular type of parameter of each input parameter of the set of input parameters, a second set of source code;
      combining the first set of source code and the second set of source code into a source code file;
      compiling the source code file into an executable program; and
      executing the executable program to perform a registration process for the first particular function and the second particular function; and
   providing access to each registered function in a different application.

2. The system of claim 1, wherein the operations further comprise:
   receiving a request to initiate execution of the UDF corresponding to a particular function.

3. The system of claim 1, wherein the operations further comprise:
   receiving the set of files corresponding to the library, wherein the library comprises the set of functions included in the set of files; and
   parsing the set of files.

4. The system of claim 3, wherein the first particular function and the second particular function are different functions, and wherein the first set of input parameters and the second set of input parameters are different input parameters.

5. The system of claim 1, wherein the registration process includes storing information corresponding to the first particular function and the second particular function in a metadata database.

6. The system of claim 1, wherein registering the function as the UDF comprises:
   generating a name for the function based at least in part on a predetermined prefix, wherein the predetermined prefix comprises an alphanumeric string.

7. The system of claim 1, wherein identifying the set of functions included in the set of files is based at least in part on a pattern string.

8. The system of claim 1, wherein identifying the set of functions included in the set of files is based at least in part on a logical grouping of source code.

9. The system of claim 1, wherein the operations further comprise:
   determining that a particular UDF has already been registered prior to registering a first function identified from the set of files, wherein the particular UDF and the first function have at least a same function name.

10. The system of claim 9, wherein the operations further comprise:
    registering the first function as a new UDF, wherein the registering of the first function overwrites and replaces the particular UDF as previously registered.

11. A method comprising:
    identifying a set of functions included in a set of files corresponding to a library;
    for each function in the set of functions, registering the function as a user defined function (UDF) based on a set of input parameters utilized by the function and a type of parameter of each input parameter of the set of input parameters, wherein registering the function as the UDF comprises:
       generating, using at least a first set of input parameters utilized by a first particular function and a first particular type of parameter of each input parameter of the set of input parameters, a first set of source code;
       generating, using at least a second set of input parameters utilized by a second particular function and a second particular type of parameter of each input parameter of the set of input parameters, a second set of source code;
       combining the first set of source code and the second set of source code into a source code file;
       compiling the source code file into an executable program; and
       executing the executable program to perform a registration process for the first particular function and the second particular function; and
    providing access to each registered function in a different application.

12. The method of claim 11, further comprising:
    receiving a request to initiate execution of the UDF corresponding to a particular function.

13. The method of claim 11, further comprising:
receiving the set of files corresponding to the library, wherein the library comprises the set of functions included in the set of files; and
parsing the set of files.

14. The method of claim 13, wherein the first particular function and the second particular function are different functions, and wherein the first set of input parameters and the second set of input parameters are different input parameters.

15. The method of claim 11, wherein the registration process includes storing information corresponding to the first particular function and the second particular function in a metadata database.

16. The method of claim 11, wherein registering the function as the UDF comprises:
generating a name for the function based at least in part on a predetermined prefix, wherein the predetermined prefix comprises an alphanumeric string.

17. The method of claim 11, wherein identifying the set of functions included in the set of files is based at least in part on a pattern string.

18. The method of claim 11, wherein identifying the set of functions included in the set of files is based at least in part on a logical grouping of source code.

19. The method of claim 11, further comprising:
determining that a particular UDF has already been registered prior to registering a first function identified from the set of files, wherein the particular UDF and the first function have at least a same function name.

20. The method of claim 19, further comprising:
registering the first function as a new UDF, wherein the registering of the first function overwrites and replaces the particular UDF as previously registered.

21. A computer-storage medium storing instructions that, when executed by one or more processors of a machine, configure the machine to perform operations comprising:
identifying a set of functions included in a set of files corresponding to a library;
for each function in the set of functions, registering the function as a user defined function (UDF) based on a set of input parameters utilized by the function and a type of parameter of each input parameter of the set of input parameters, wherein registering the function as the UDF comprises:
generating, using at least a first set of input parameters utilized by a first particular function and a first particular type of parameter of each input parameter of the set of input parameters, a first set of source code;
generating, using at least a second set of input parameters utilized by a second particular function and a second particular type of parameter of each input parameter of the set of input parameters, a second set of source code;
combining the first set of source code and the second set of source code into a source code file;
compiling the source code file into an executable program; and
executing the executable program to perform a registration process for the first particular function and the second particular function; and
providing access to each registered function in a different application.

22. The computer-storage medium of claim 21, wherein the operations further comprise:
receiving a request to initiate execution of the UDF corresponding to a particular function.

23. The computer-storage medium of claim 21, wherein the operations further comprise:
receiving the set of files corresponding to the library, wherein the library comprises the set of functions included in the set of files; and
parsing the set of files.

24. The computer-storage medium of claim 23, wherein the first particular function and the second particular function are different functions, and wherein the first set of input parameters and the second set of input parameters are different input parameters.

25. The computer-storage medium of claim 21, wherein the registration process includes storing information corresponding to the first particular function and the second particular function in a metadata database.

26. The computer-storage medium of claim 21, wherein registering the function as the UDF comprises:
generating a name for the function based at least in part on a predetermined prefix, wherein the predetermined prefix comprises an alphanumeric string.

27. The computer-storage medium of claim 21, wherein identifying the set of functions included in the set of files is based at least in part on a pattern string.

28. The computer-storage medium of claim 21, wherein identifying the set of functions included in the set of files is based at least in part on a logical grouping of source code.

29. The computer-storage medium of claim 21, wherein the operations further comprise:
determining that a particular UDF has already been registered prior to registering a first function identified from the set of files, wherein the particular UDF and the first function have at least a same function name.

30. The computer-storage medium of claim 29, wherein the operations further comprise:
registering the first function as a new UDF, wherein the registering of the first function overwrites and replaces the particular UDF as previously registered.

* * * * *

UNITED STATES PATENT AND TRADEMARK OFFICE
CERTIFICATE OF CORRECTION

PATENT NO. : 11,755,291 B1  
APPLICATION NO. : 18/104020  
DATED : September 12, 2023  
INVENTOR(S) : Du et al.

Page 1 of 1

It is certified that error appears in the above-identified patent and that said Letters Patent is hereby corrected as shown below:

On the Title Page

In Column 2, under "Other Publications", Lines 5-6, delete "Jan. 9, 2023"," and insert --Jan. 17, 2023",-- therefor Signed and Sealed this  
Seventh Day of January, 2025

Derrick Brent  
*Acting Director of the United States Patent and Trademark Office*